Sept. 27, 1960　　　　W. G. LEEK, JR　　　　2,954,045
METERING DEVICE
Filed Nov. 19, 1956
FIG. 1.
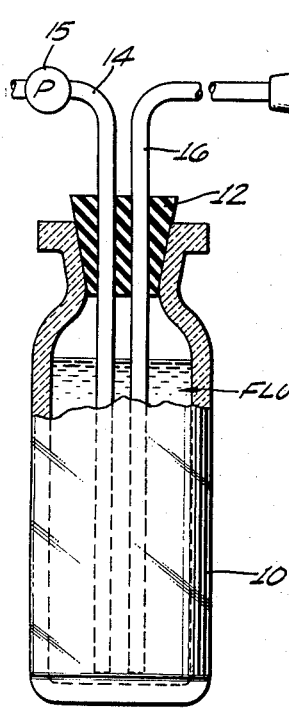
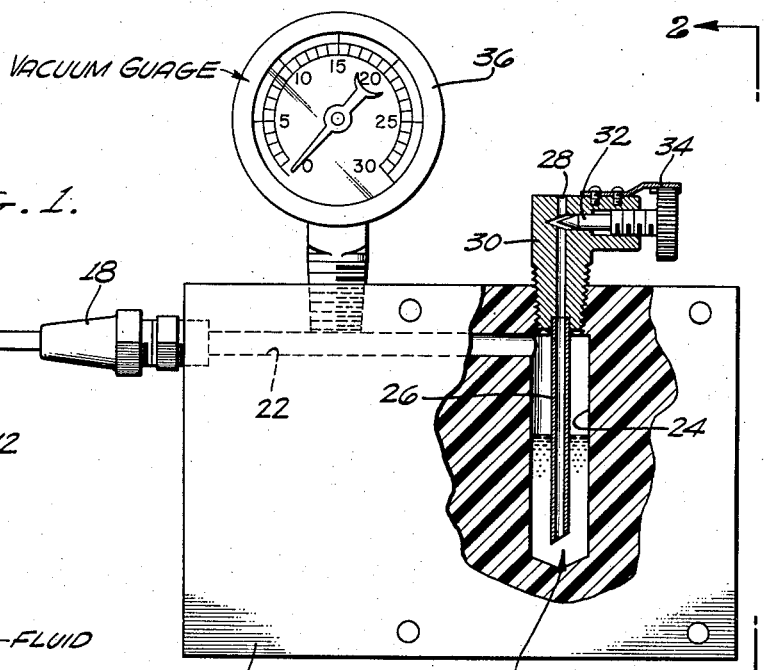
FIG. 2.
WILLIAM G. LEEK, JR.
INVENTOR.
BY *Lyon & Lyon*
ATTORNEYS

United States Patent Office 2,954,045
Patented Sept. 27, 1960

2,954,045

METERING DEVICE

William G. Leek, Jr., 630 Hermosa Drive,
Palm Springs, Calif.

Filed Nov. 19, 1956, Ser. No. 623,100

2 Claims. (Cl. 137—251)

This invention relates to an improved metering device.

It is an object of this invention to provide a device for metering the flow of liquid into a suction line with increased accuracy and control.

It is a further object of this invention to provide such a device particularly adaptable to the use of caustic liquids without possibility of breakdowns and with increased longevity.

It is still a further object of this invention to provide a device adaptable to use with liquids which, because of their viscosity, cannot flow through openings small enough to feed minute amounts.

Other objects and advantages will be readily apparent from the following description.

In the drawings:

Figure 1 is a plan view partially in section of a device embodying this invention.

Figure 2 is a view taken along line 2—2 of Figure 1.

Referring to the embodiment illustrated in Figures 1 and 2, the liquid to be metered is contained in a bottle 10. An airtight stopper 12 is fitted into the neck of the bottle having an outlet tube 14 projecting therethrough. Tube 14 has one extremity adjacent the bottom of bottle 10 and the other connected to a suction pump 15, venturi or other source of negative pressure which draws the liquid from the bottle through tube 14 and into whatever the liquid in bottle is being metered. For example, the bottle 10 may contain sodium hypochlorite to be metered through tube 14 into water being added to a swimming pool.

The stopper 12 has a second tube 16 passing through same for the purpose of adding air to bottle 10 as the liquid is drawn therefrom. It is apparent that the rate of adding air to the bottle will control the rate of discharge of liquid therefrom.

In this embodiment the tube 16 is connected to a nipple 18 on a block 20 which is formed of a suitable transparent material. A passage 22 in block 20 communicates nipple 18 with reservoir 24 formed in the block. Projecting into the reservoir is a tube 26 which communicates with a bore 28 in nipple 30. A needle valve 32 is provided in nipple 30 projecting into bore 28. As the needle valve is screwed in or out in the nipple the bore 28 is opened and shut, controlling flow of air from the atmosphere into tube 26 and hence reservoir 24. The needle valve has a knurled knob and leaf spring 34 engages same to provide a delicate control of the positioning of the needle valve. The reservoir 24 may be partially filled with a suitable oil to permit visual inspection of the rate of admittance of air as same leaves the lower extremity of tube 26 immersed in the oil and bubbles to the surface. Thus the number of bubbles rising in the oil can be counted and the rate varied by needle valve 32.

If desired, a vacuum gauge 36 may be mounted on block 20 communicating with passage 22 to give a direct reading of the vacuum created in passage 22 and hence tube 16.

Thus, by adjustment of needle valve 32, the rate of admittance of air into bottle 10 is controlled which in turn governs the rate of discharge of liquid from bottle 10, assuming of course, the pressure of pump 15 or whatever other source of negative pressure is utilized, remains constant.

While what hereinbefore has been described is the preferred embodiment of this invention, it is readily apparent that alterations and modifications can be resorted to without departing from the scope of this invention and such alterations and modifications are intended to be included within the scope of the appended claims.

I claim:

1. A device of the type to be attached to a vacuum source for metering liquids comprising: a container for liquids to be metered, a stopper in said container, an outlet conduit piercing said stopper, said conduit to be connected to said vacuum source, an air inlet conduit piercing said stopper, a liquid reservoir connecting with said inlet conduit, means for admitting air into the liquid in said reservoir, and means for controlling flow of air into said liquid reservoir.

2. A device of the type to be attached to a vacuum source for metering liquids comprising: a container for liquids to be metered, a stopper in said container, an outlet conduit piercing said stopper, said conduit to be connected to said vacuum source, an air inlet conduit piercing said stopper, a liquid recervoir connecting with said inlet conduit, means for admitting air into liquid in said air reservoir, means for controlling flow of air into said liquid reservoir, and a vacuum gauge connected to said air inlet conduit.

References Cited in the file of this patent

UNITED STATES PATENTS

| | | |
|---|---|---|
| 678,462 | Etheridge | July 16, 1901 |
| 2,049,559 | Evans | Aug. 4, 1936 |
| 2,065,583 | Heitzmann | Dec. 29, 1936 |
| 2,333,310 | Greening | Nov. 2, 1943 |
| 2,660,357 | Fechheimer | Nov. 24, 1953 |